United States Patent
Emmons et al.

(10) Patent No.: US 6,542,385 B1
(45) Date of Patent: Apr. 1, 2003

(54) DUT POWER SUPPLY HAVING IMPROVED SWITCHING DC-DC CONVERTER

(75) Inventors: Thomas R. Emmons, Minneapolis, MN (US); Kevin Frost, Maple Grove, MN (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 09/718,780

(22) Filed: Nov. 22, 2000

(51) Int. Cl.$^7$ ............................................... H02M 3/335
(52) U.S. Cl. ......................................... 363/17; 363/132
(58) Field of Search ............................... 363/16, 17, 34, 363/37, 95, 96, 98, 89, 124, 132, 137

(56) References Cited

U.S. PATENT DOCUMENTS

| | | | |
|---|---|---|---|
| 3,670,230 A | 6/1972 | Rooney et al. | |
| 4,563,731 A | * 1/1986 | Sato et al. | 363/17 |
| 4,574,232 A | 3/1986 | Petty | |
| 4,710,861 A | 12/1987 | Kanner | |
| 4,940,929 A | 7/1990 | Williams | |
| 4,952,863 A | 8/1990 | Sartwell et al. | |
| 5,055,992 A | * 10/1991 | Cook | 363/98 |
| 5,103,388 A | 4/1992 | Williams et al. | |
| 5,130,635 A | 7/1992 | Kase | |
| 5,686,820 A | 11/1997 | Riggio, Jr. | |
| 5,712,774 A | 1/1998 | Uramoto | |
| 5,721,490 A | * 2/1998 | Takano et al. | 324/322 |
| 5,757,203 A | 5/1998 | Brown | |
| 5,767,744 A | * 6/1998 | Irwin et al. | 330/297 |
| 5,773,990 A | 6/1998 | Wilstrup et al. | |
| 5,789,933 A | 8/1998 | Brown et al. | |
| 5,789,934 A | 8/1998 | Kolkowski et al. | |
| 5,886,892 A | 3/1999 | Radley et al. | |
| 5,914,870 A | 6/1999 | Noble et al. | |
| 5,917,318 A | 6/1999 | Kamata | |
| 5,925,278 A | 7/1999 | Hirst | |
| 5,932,996 A | 8/1999 | Liepe et al. | |
| 5,973,946 A | * 10/1999 | Yasummura | 363/89 |
| 6,046,577 A | 4/2000 | Rincon-Mora et al. | |
| 6,087,843 A | 7/2000 | Pun et al. | |

* cited by examiner

*Primary Examiner*—Adolf Deneke Berhane
(74) *Attorney, Agent, or Firm*—Lance Kreisman

(57) ABSTRACT

A switching DC-DC converter unit is disclosed that includes an input for receiving a first DC voltage from a DC power source and switching circuitry coupled to the input to generate a switched alternating voltage from the first DC voltage. The switching circuitry includes a plurality of semiconductor switches having respective gate, source and drain leads, and further including noise suppression elements disposed on the drain leads. The unit further includes transformer circuitry coupled to the output of the switching circuitry and conversion circuitry disposed at the output of the transformer circuitry to convert the switched alternating voltage to a second DC voltage.

7 Claims, 4 Drawing Sheets

DUT POWER SUPPLY HAVING IMPROVED SWITCHING DC-DC CONVERTER

FIELD OF THE INVENTION

The invention relates generally to automatic test equipment and more particularly a switching DC-DC converter with noise suppression circuitry for use with a semiconductor tester power supply to provide precise voltage and current levels to a high-speed semiconductor device-under-test (DUT).

BACKGROUND OF THE INVENTION

Semiconductor device manufacturing typically includes test processes at both the wafer and packaged-device levels. The testing is normally carried out by automatic test equipment ATE that simulates a variety of operating conditions to verify the functionality of each device. As is well known in the art, semiconductor devices generally require a source of power in order to function.

As the speeds of modern semiconductors increase, the dynamic current requirements necessary to operate the devices also increase. This is due to many variables, such as the reduction in logic level voltages, higher switching speeds, higher transistor counts, transistor technology, etc. As it stands, modem microprocessors may draw from a few hundred milli-amps in static conditions, to over two-hundred amps during dynamic conditions over the course of a few nanoseconds.

Unlike power supplies that are typically employed in, for example, a personal computer, power supplies for automatic test equipment applications generally must be accurate, fast, and programmable. Device manufacturers often test a semiconductor part to characterize extreme operating ranges, and desire high accuracy to enable proper "binning" of the highest speed devices. Just a few millivolts of inaccuracy can result in a gigahertz speed device sorted in a lower speed bin. Because higher speed devices command significantly higher prices for manufacturers, power supply accuracy plays an important role in the overall test process.

Conventional DUT power supplies typically include a switching DC-DC converter to step-down a high voltage to a lower DUT operating voltage. It is well-known in the art that switching DC-DC converters provide a more efficient conversion scheme in terms of power dissipation than, for example, linear conversion schemes. A typical switching converter includes switching circuitry for producing a square-wave signal from the high-voltage DC, and conversion circuitry in the form of a transformer coupled with a diode and relatively large inductor/capacitor components for converting the square-wave signal into the low voltage DC level.

While the conventional switching converter scheme described above works well for its intended applications to power relatively slower-speed and low-power consuming semiconductor devices, for high-speed device applications the design is susceptible to noise problems. As logic voltage levels decrease, noise in the form of ringing as the circuit switches undesirably affects the DC output supplied to the semiconductor device. Moreover, the large capacitors that are commonly employed in conventional schemes tend to generate large amounts of noise. For important high-accuracy applications such as in the field of automatic testing, ringing and other forms of noise may cause improper fail data in the test results because of inaccuracy in the DUT supply voltage. This would possibly lower the device manufacturing yields.

What is needed and heretofore unavailable is a high accuracy switching DC-DC converter that is adaptable for use in a DUT power supply and that can minimize noise and power dissipation. The switching DC-DC converter of the present invention satisfies these needs.

SUMMARY OF THE INVENTION

The switching DC-DC converter of the present invention provides high-speed voltage conversion performance to devices-under-test while maintaining stringent accuracy requirements. As a result, semiconductor device manufacturers can maximize device yields and correspondingly reduce test costs.

To realize the foregoing advantages, the invention in one form comprises a switching DC-DC converter unit is disclosed that includes an input for receiving a first DC voltage from a DC power source and switching circuitry coupled to the input to generate a switched alternating voltage from the first DC voltage. The switching circuitry includes a plurality of semiconductor switches having respective gate, source and drain leads, and further including noise suppression elements disposed on the drain leads. The unit further includes transformer circuitry coupled to the output of the switching circuitry and conversion circuitry disposed at the output of the transformer circuitry to convert the switched alternating voltage to a second DC voltage.

In another form, the invention comprises a switching DC-DC converter system including a plurality of switching converter units disposed in parallel. Each of the converter units includes a first input for receiving a first DC voltage from a DC power source and switching circuitry coupled to the input to generate a stepped voltage waveform from the constant input voltage. A phase controller sequentially switches the converter units according to predetermined timings to generate a multi-phased output voltage waveform while conversion circuitry converts the switched alternating output voltage to a second DC voltage.

Other features and advantages of the present invention will be apparent from the following detailed description when read in conjunction with the accompanying drawings.

BRIEF DESCRIPTION OF THE DRAWINGS

The invention will be better understood by reference to the following more detailed description and accompanying drawings in which.

DETAILED DESCRIPTION OF THE INVENTION

The switching DC-DC converter of the present invention minimizes output voltage level inaccuracies attributable to generating a switched step waveform by employing unique noise suppression circuitry. Because of its high accuracy capability, the converter is well-suited for use in a device-under-test (DUT) power supply.

Figure 1:
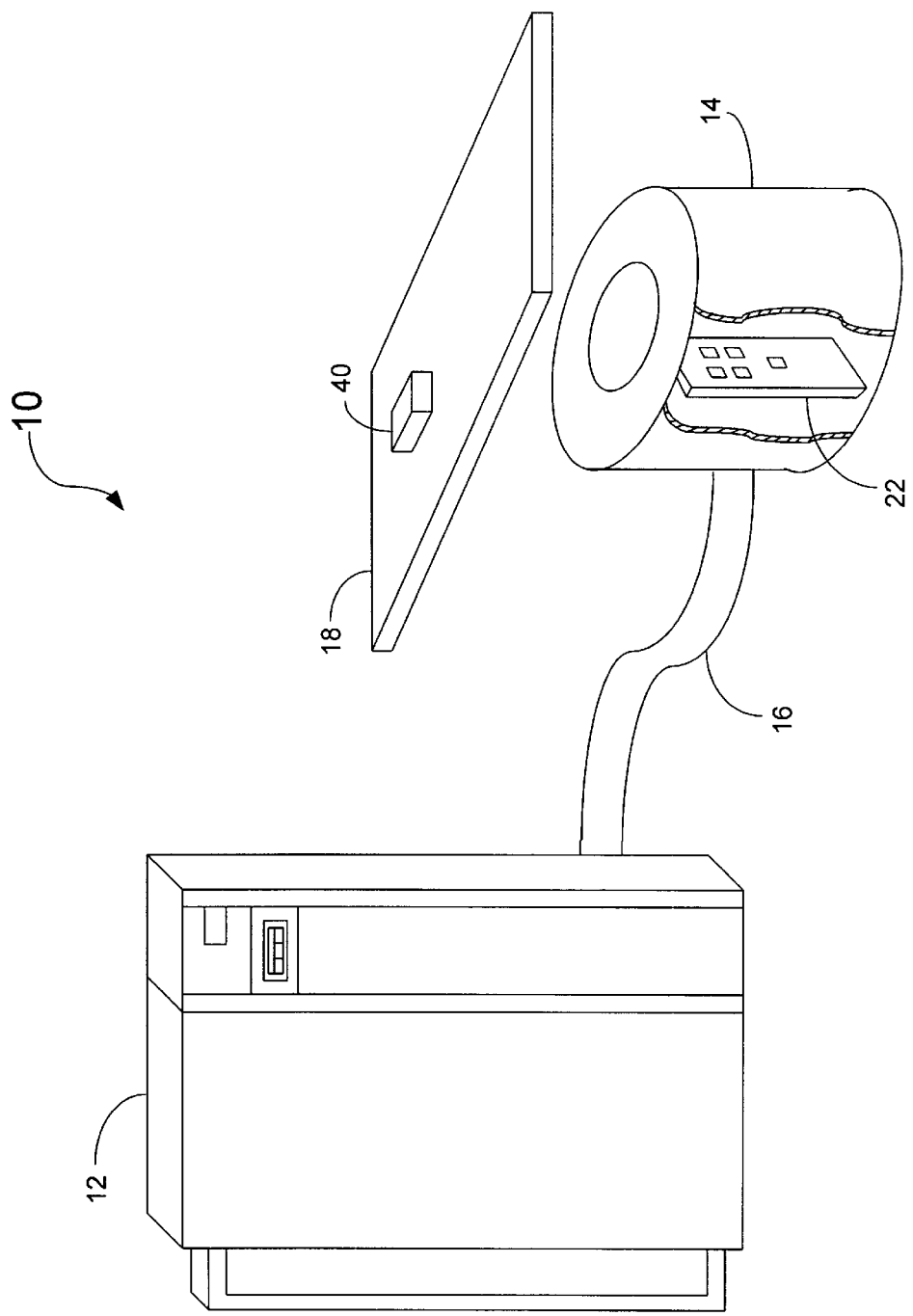
FIG. 1 is a block diagram of a semiconductor tester according to one form of the present invention.

Referring now to FIG. 1, the DUT power supply 30 is employed in automatic test equipment, often referred to as a semiconductor tester, and generally designated 10. The tester generally includes a computer workstation 12 that couples to a test head 14 via a cable bundle 16. The test head houses a plurality of channel cards (not shown) including the DUT power supplies that take the form of power supply boards (only one board shown) disposed in relative close proximity to a device-under-test (DUT) 40. The DUT mounts to a device-interface-board 18, often referred to as a "DIB" in packaged-device applications, that interfaces with the test head via a tester interface (not shown) to effect an interconnection of signal, ground and power paths between the tester and the DUT.

Figure 2:
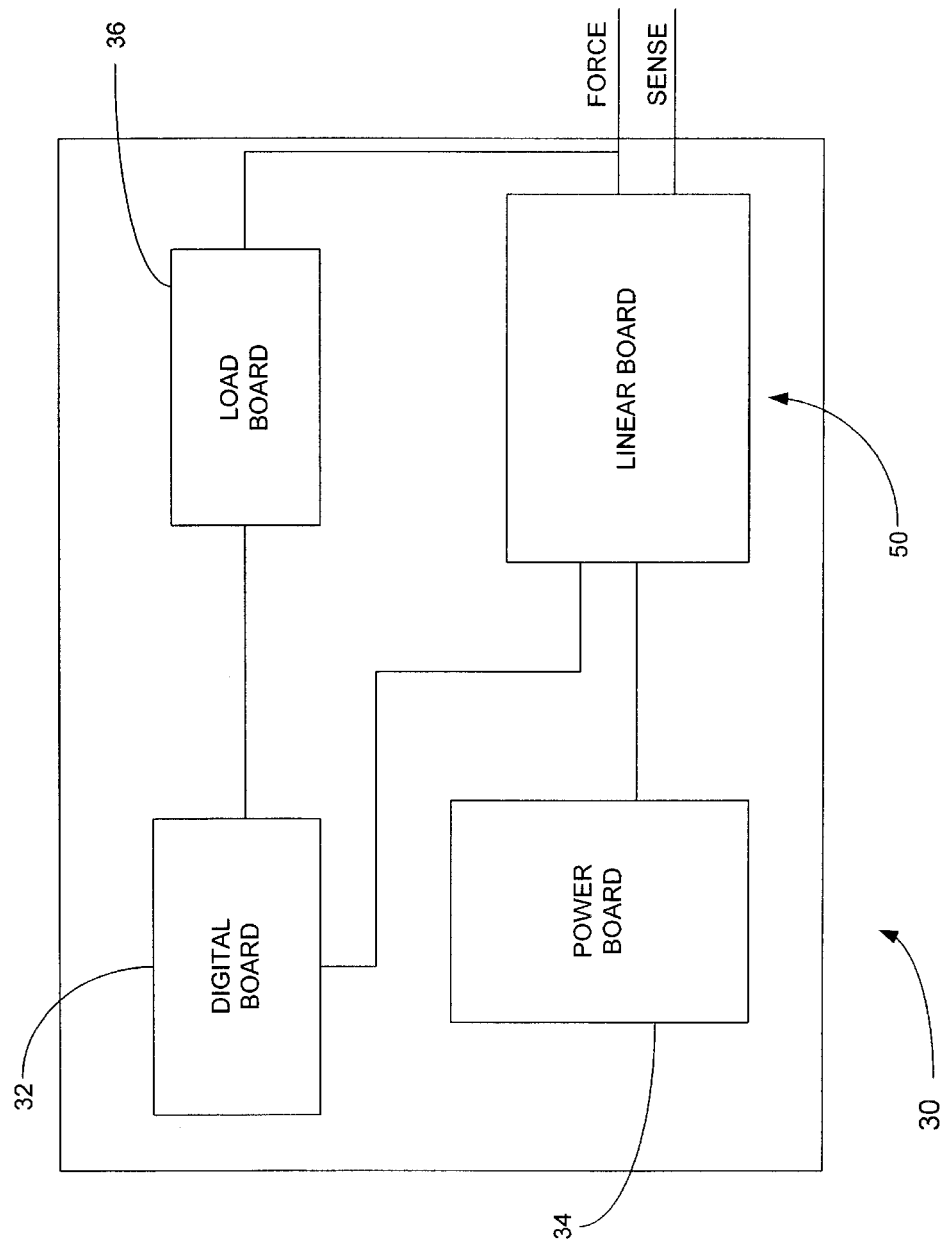
FIG. 2 is a block diagram of a DUT power supply according to one form of the present invention.

With reference to FIG. 2, the DUT power supply 30 preferably comprises a multi-board structure, and generally includes a programmable digital board 32 that provides a digital-to-analog control interface between the power supply and the tester. A power board 34 couples to the digital board and mounts the DC-DC converter system of the present invention. The output from the power board feeds a linear amplifier 50 and a load board 36 that provides a unique self-test capability for the power supply. This unique overall architecture, including the load board construction, is more fully described in co-pending U.S. application Ser. No. 09/943,275, titled "DUT Power Supply", filed Aug. 30, 2001, assigned to the assignee of the present invention, and expressly incorporated herein by reference. The linear amplifier 50 takes the form of a high accuracy and high-speed construction as more fully set forth in co-pending U.S. application Ser. No. 09/797,511, titled "High Current and High Accuracy Linear Amplifier", filed Mar. 1, 2001, and Ser. No. 09/718,808, titled "High Current and High Accuracy DUT Power Supply With Active Boost Circuitry", filed Nov. 22, 2000, both assigned to the assignee of the present invention and expressly incorporated herein by reference.

Figure 3:
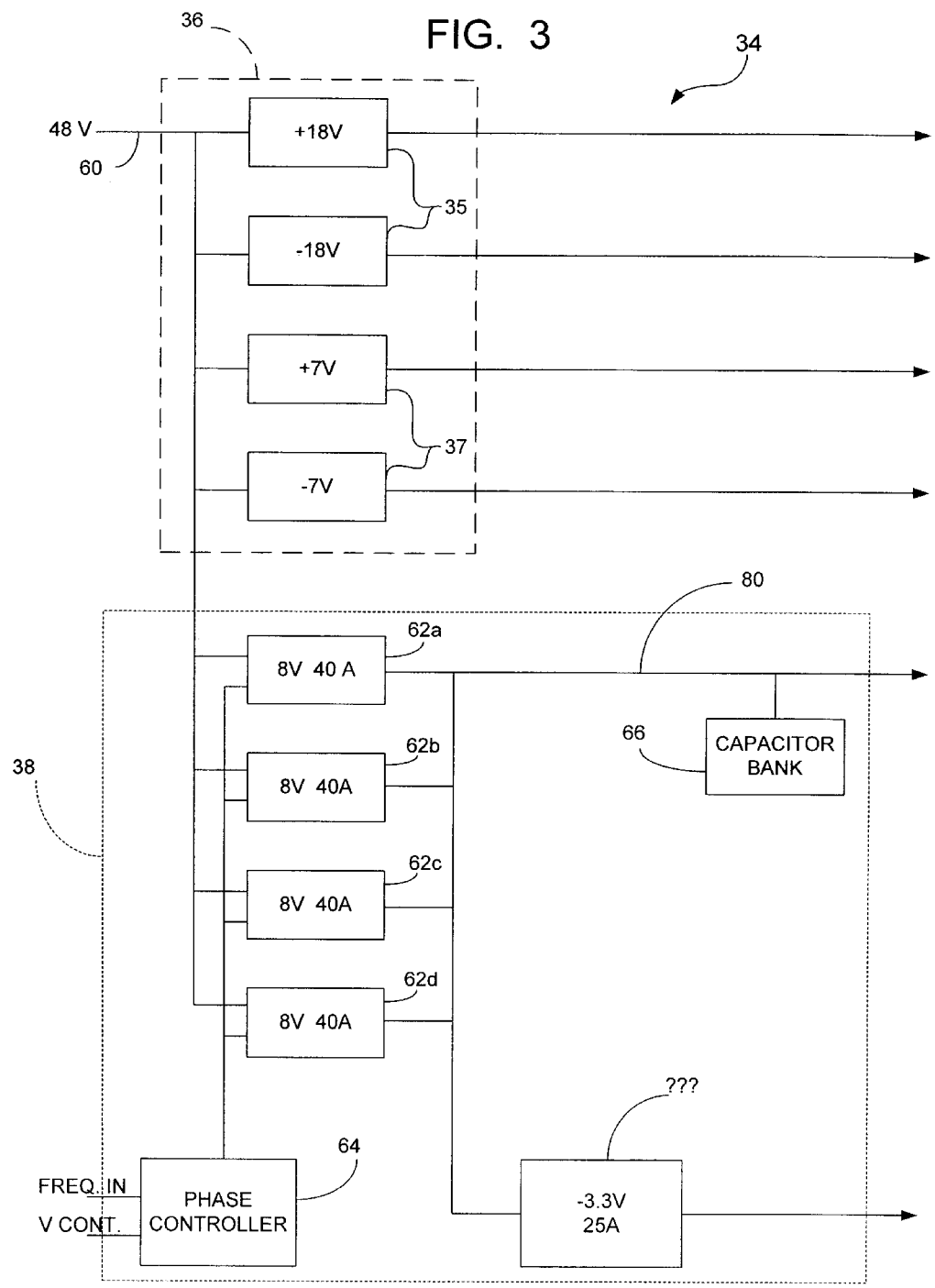
FIG. 3 is a block diagram of the power board shown in FIG. 2.

Referring now to FIG. 3, the power board 34 includes regulating circuitry 36 for providing operating voltages for the various sub-circuits of the power supply 30, and step-down circuitry 38 for generating the high accuracy DUT supply voltage. The regulating circuitry comprises a plurality of standard +/−18 volt and +/−7 volt power supplies 35 and 37 disposed in parallel and having inputs coupled to a 48 volt busbar 60. The separate outputs of the supplies are dispersed to the various supply boards to provide different operating voltages as required.

With continued reference to FIG. 3, the step-down circuitry 38 generally includes a plurality of switching-type step-down transformer converters 62a through 62d that are disposed in parallel and receive as inputs both the 48 volt busbar voltage and a command signal from a phase controller 64. The outputs from the converter array are fed to an output capacitor bank 66. Because of the action of the phase controller (as more fully described below) in sequencing the step-voltage outputs of the converter units, the size of the capacitor bank is minimized, correspondingly reducing the amount of noise associated therewith.

Figure 4:
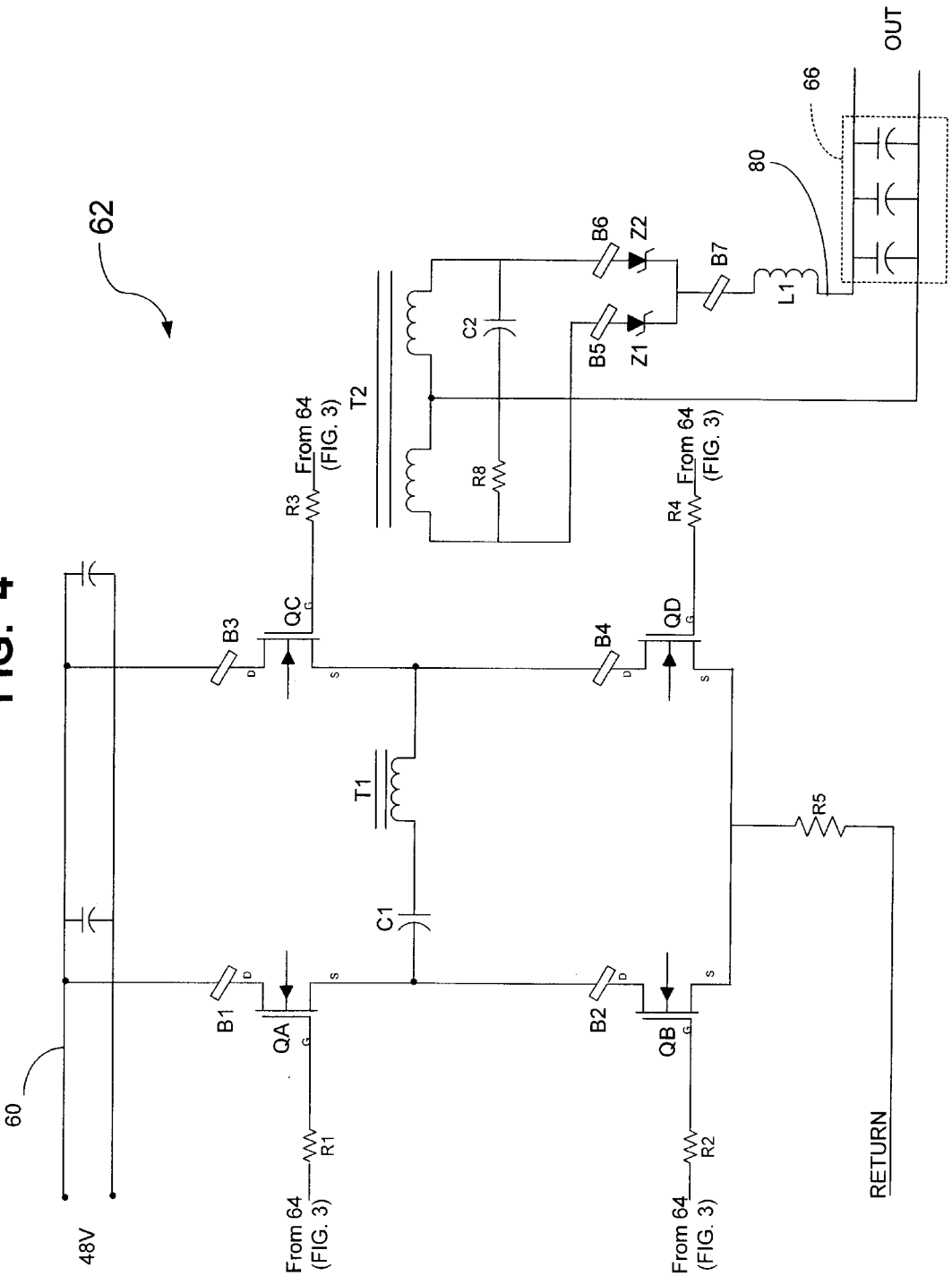
FIG. 4 is a block diagram schematic of an individual converter unit shown in FIG. 3.

Referring now to FIG. 4, each step-down converter 62 includes a full-bridge configuration of field-effect-transistors (FET's) QA, QB, QC and QD. Transistors QA and QC are disposed in parallel with respective drain terminals D coupled to the high DC voltage busbar 60, gate terminals G coupled to respective input resistors R1 and R2 and respective source terminals S disposed on opposing ends of a primary transformer winding T1. A balancing capacitor C1 is interposed between T1 and the transistor QA source terminal. Transistors QB and QD are similarly coupled in parallel, each having its source terminal S connected through a resistor R5 to ground (return), gate terminals G tied to respective input resistors R2 and R4, and respective drain terminals D coupled in series to the respective source terminals S of transistors QA and QC.

Further referring to FIG. 4, the transistor drain terminals D are fitted with respective cylindrical ferrite beads B1, B2, B3 and B4. The inventor has unexpectedly discovered that by employing ferrite beads on the drain leads, rather than following the conventional wisdom of using beads on the gate leads (to reduce the input gate drive noise), ringing on the output waveform due to the switching action of the converter is dramatically minimized.

With continued reference to FIG. 4, the primary transformer winding T1 is mutually coupled to a secondary transformer winding T2 for an approximate 5:1 step-down reduction in the switched voltage magnitude. The output of the secondary transformer winding is shunted by a series RC branch comprising resistor R8 and capacitor C2. The transformer feeds a dual schottkey diode structure Z1 and Z2 having respective input ferrite beads B5 and B6. The diodes are connected to an inductor L1 in a "common cathode" configuration. An output bead B7 is disposed at the dual diode output to further reduce ringing. The inductor output waveform is fed to the output busbar 80, where it is acted upon by the capacitor bank 66 to maintain a constant DC voltage level.

In operation, the switched DC-DC converter of the present invention steps-down a 48 volt DC input to a highly accurate 4.5 volt level at 325 amperes with very little noise associated therewith. The noise reduction features of the present invention cooperate together at both the system and component levels as more fully described below.

Each converter unit 62 operates with the phase controller 64 to alternately activate pairs of FET's QA, QD and QC, QB in the full bridge to generate current flow from the high voltage busbar 60, across the primary transformer winding T1, and through the resistor R5, to the return path. A convenient zero volt switching (ZVS) technique, well known to those skilled in the art, assists in activating the associated pairs of transistors with minimal noise generated across the primary transformer winding T1. The alternating action is balanced by the balancing capacitor C1 so that the transformer minimizes resonant and harmonic problems and establishes step-waveforms with positive and negative polarities. The secondary transformer winding T2 picks up and steps-down voltage waveforms, where they are rectified by the dual diode structure Z1 and Z2. The phase controller 64 additionally provides a programmable phase overlap capability, allowing the positive and negative waveforms to slightly overlap in phase. This allows for a refinement in the desired duty cycle at the output of the diodes. The step waveform is then fed over the output busbar 80 to the capacitor bank 66.

While the first converter 62a generates its waveform, the phase controller 64 sequences the next converter 62b to provide the same waveform, albeit delayed in phase. This "multi-phasing" continues, in effect producing an output step-frequency of N-times the frequency of a single converter unit (where N=the number of units). This not only allows for the use of slower (and less noisy) switching converters, but also provides a higher frequency waveform to minimize the energy storage required by the capacitor bank to convert the stepped waveform to a constant and accurate DC voltage level.

Those skilled in the art will appreciate the numerous benefits and advantages afforded by the present invention. Of particular significance is the implementation of a multiphasing converter scheme to allow the use of low speed, low cost, and low noise components that cooperate to generate a high speed waveform. The high speed waveform can then be more easily converted to DC by smaller, less noisy capacitors to set the DC output voltage. Moreover, by employing ferrite beads on the drain leads of the FET full bride circuit, ringing on the output waveform is even further minimized.

While the invention has been particularly shown and described with reference to the preferred embodiments thereof, it will be understood by those skilled in the art that various changes in form and detail may be made therein without departing from the spirit and scope of the invention.

What is claimed is:

1. A switching DC-DC converter unit including:
    an input for receiving a first DC voltage from a DC power source;
    switching circuitry coupled to said input to generate a switched alternating voltage from said first DC voltage, said switching circuitry including a plurality of semiconductor switches, said switches having respective gate, source and drain leads, said switching circuitry further including noise suppression elements disposed on said drain leads; and
    transformer circuitry coupled to the output of said switching circuitry; and
    conversion circuitry disposed at the output of said transformer circuitry to convert said switched alternating voltage to a second DC voltage.

2. A switching DC-DC converter according to claim 1 wherein:
    said plurality of FETs are configured in a full-bridge orientation.

3. A switching DC-DC converter wherein:
    said noise suppression elements comprise ferrite beads.

4. A switching DC-DC converter system including:
    a plurality of switching converter units disposed in parallel, each of said converter units including
    a first input for receiving a first DC voltage from a DC power source;
    switching circuitry coupled to said input to generate a stepped voltage waveform from said constant input voltage;
    a phase controller to sequentially switch said converter units according to predetermined timings to generate a multi-phased output voltage waveform; and
    conversion circuitry to convert said switched alternating output voltage to a second DC voltage.

5. A switching DC-DC converter system according to claim 4 wherein:
    said switching circuitry includes a plurality of semiconductor switches disposed in a full-bridge configuration.

6. A switching DC-DC converter system according to claim 4 wherein:
    said switching circuitry further includes transformer circuitry.

7. A DUT power supply for use with automatic test equipment, said DUT power supply including:
    a digital controller;
    a switching DC-DC converter system responsive to said digital controller and including
        a plurality of switching converter units disposed in parallel, each of said converter units including
            a first input for receiving a first DC voltage from a DC power source;
            switching circuitry coupled to said input to generate a stepped voltage waveform from said constant input voltage;
        a phase controller to sequentially switch said converter units according to predetermined timings to generate a multi-phased output voltage waveform and
        conversion circuitry to convert said switched alternating output voltage to a second DC voltage; and
    a linear amplifier disposed at the output of said switching DC-DC converter.

* * * * *